(No Model.)
A. KIGER.
Machine for Shrinking Tires.
No. 243,380. Patented June 28, 1881.
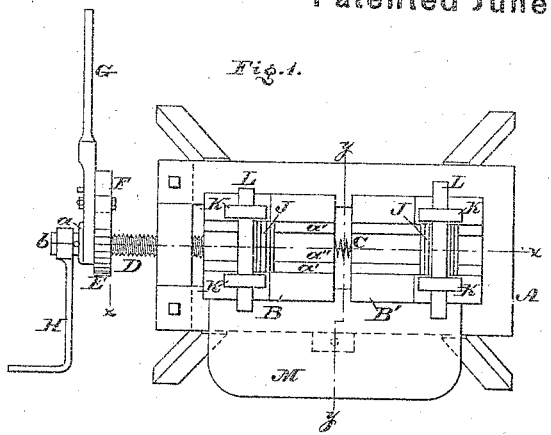
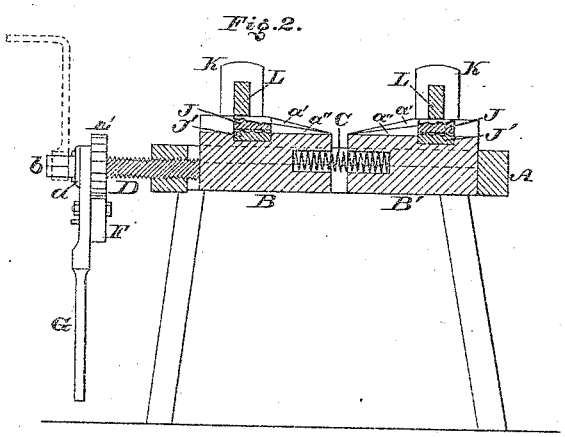
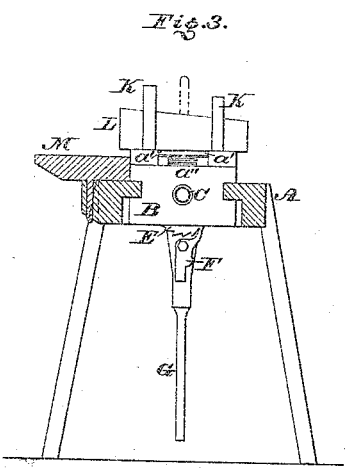
Witnesses:
A. P. Grant
W. F. Kircher
Inventor:
Alfred Kiger,
by John A. Wiedersheim
ATTORNEY.

UNITED STATES PATENT OFFICE.

ALFRED KIGER, OF DARETOWN, NEW JERSEY.

MACHINE FOR SHRINKING TIRES.

SPECIFICATION forming part of Letters Patent No. 243,380, dated June 28, 1881.

Application filed March 26, 1881. (No model.)

*To all whom it may concern:*

Be it known that I, ALFRED KIGER, a citizen of the United States, residing at Daretown, in the county of Salem, State of New Jersey, have invented a new and useful Improvement in Tire, &c., Shrinkers, which improvement is fully set forth in the following specification and accompanying drawings, in which—

Figure 1 is a top or plan view of the shrinker embodying my invention. Fig. 2 is a longitudinal vertical section thereof in line $x\, x$, Fig. 1. Fig. 3 is a transverse vertical section thereof in line $y\, y$, Fig. 1.

Similar letters of reference indicate corresponding parts in the several figures.

My invention consists of a shrinker for tires, bars, &c., which is cheap, simple, durable, and reliable, as will be hereinafter fully set forth.

Referring to the drawings, A represents a frame or stand supporting two disconnected beds, B B', between the inner faces of which is a spring, C, for the purpose of separating one bed from the other. Fitted to one end of the frame A is a horizontally and longitudinally extending screw-shaft, D, which is adapted to bear against the bed B and force it toward the bed B'; and to said shaft is secured a ratchet, E, with which engages a pawl, F, connected to the handle or lever G, which is hung loosely on the unthreaded portion of said shaft D, and held in position by a washer, $a$, sleeve, or other appliance. The shaft has its end extended and "squared," as at $b$, for the application of a wrench or key, H, for operating said shaft independently of the lever G. Each bed B B' is recessed to receive jaws or blocks J J', placed one above the other, the upper faces whereof are serrated; and rising from the bed at the sides of said blocks are ears K, for the reception of transversely-extending wedge-pieces L. The upper face of each bed B B' is longitudinally grooved, first, as at $a'$, to the depth of the level of the upper block, J, and deeper, as at $a''$, to the depth of the level of the lower blocks, J', whereby tires and other curved and wide objects and flat and narrow bars may be shrunk on the same machine.

The operation is as follows: If a tire is to be shrunk both blocks, J J', are placed in each bed, and the heated tire rested on the upper blocks, J, and in the groove $a'$, the beds being separated. The wedges L are then driven through the ears K, thus clamping the tire to the blocks J J'. The lever G is now raised and lowered, whereby the pawl F causes the rotation of the ratchet E, and consequently of the screw-shaft D, the effect of which is to force the bed B toward the bed B', the portion of the tire on the bed B being forced against the portion on the bed B', during which operation the workman properly hammers the tire on said portions, and thus the shrinking is accomplished. The wedges L are then withdrawn, and the tire is removed, after which the operator applies the auxiliary wrench or key H to the extended end $d$ of the shaft D, and rotates the latter in the direction opposite to that occasioned by the lever and pawl G F, said pawl being held clear of the ratchet E. As the screw-shaft leaves the bed B the spring C exerts its pressure and forces said bed from the bed B', the normal position of parts. Another tire may now be applied and secured to the beds, and the operations described are repeated. When flat and narrow bars of metal are to be shrunk the upper jaws, J, are removed, and the bar is placed in the groove $a''$, and rested in the lower jaws, J', it being noticed that in either case the walls of the grooves serve to preserve the width of the tire or bar.

In order to prevent loss of the wedges L, when withdrawn, and provide a convenient place for the workman's tools, one side of the top of the frame or stand A has connected to it a table, M, which, being removable for transportation, may be said to form a continuous surface with the beds B B', the wedges when not needed remaining partly in the ears K and on said table, so as to be ready to be driven into position and clamp the tire or bar to the respective serrated blocks.

The screw-shaft D, being disconnected from the bed B, is not affected by heat, and so readily performs its work, the entire device being cheap, simple, compact, durable, and reliable.

Having thus described my invention, what I claim as new, and desire to secure by Letters Patent, is—

1. The two beds, each carrying two holding-blocks, J J', one placed removably above the other, substantially as and for the purpose set forth.

2. The beds, each with two holding-blocks and two grooves of different depths, substantially as and for the purpose set forth.

3. The beds B B', with a separating-spring, in combination with a disconnected advancing screw-shaft, substantially as and for the purpose set forth.

4. The beds B B', with holding-blocks J J', ears K, and wedges L, combined and operating substantially as and for the purpose set forth.

5. The beds B B', in combination with the screw-shaft D, having the fixed ratchet E, and the loosely-connected lever G, with pawl F, and extended, as at $b$, to form an attachment for the auxiliary wrench or key H, substantially as and for the purpose set forth.

6. The beds B B', with ears K and wedges L, in combination with the frame or stand A, having a table, M, substantially as and for the purpose set forth.

ALFRED KIGER.

Witnesses:
W. R. CASPERSON,
J. M. LIPPINCOTT.